Figure 4:
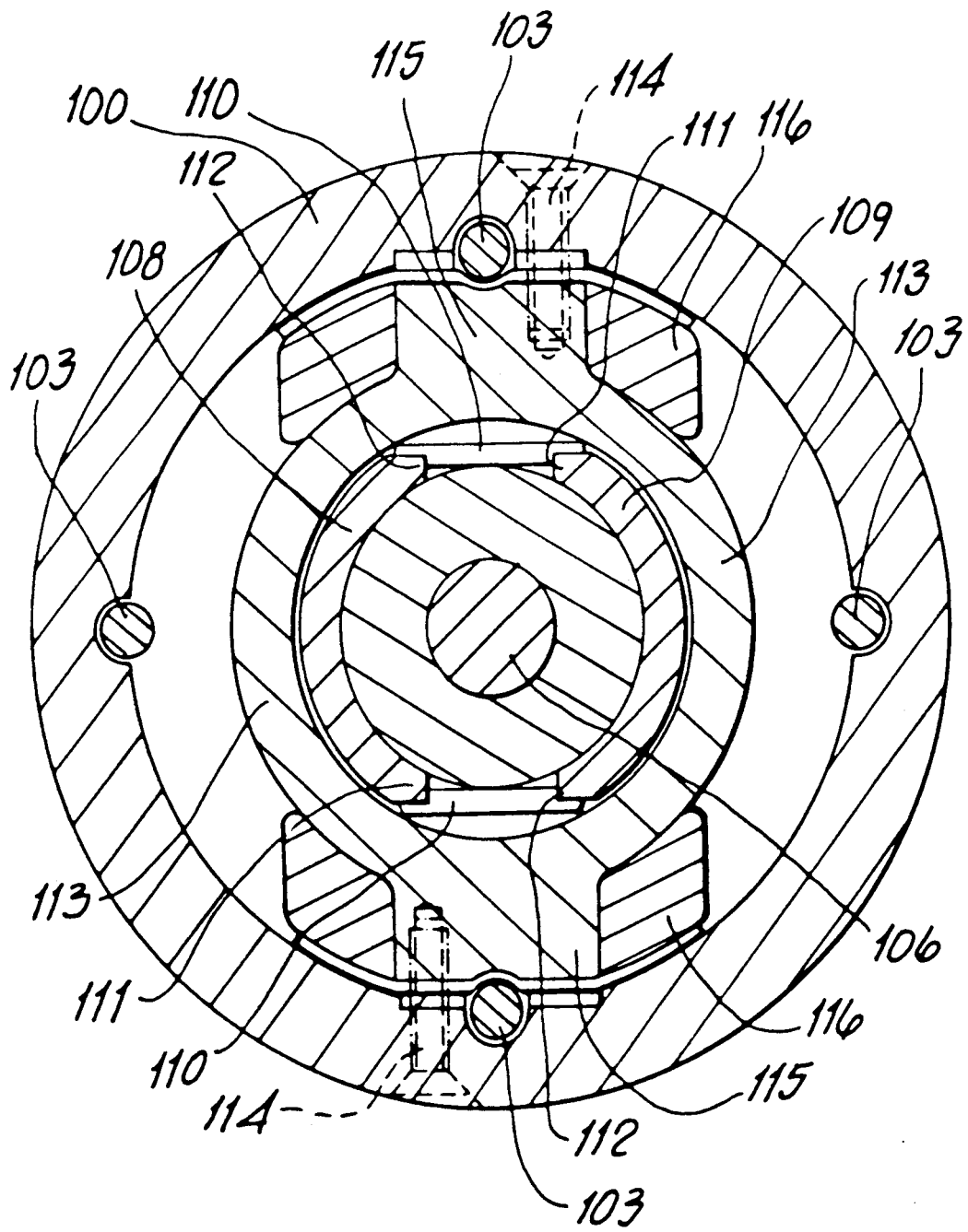

United States Patent [19]

Mavadia et al.

[11] Patent Number: 4,999,531
[45] Date of Patent: Mar. 12, 1991

[54] ELECTROMAGNETIC ACTUATORS

[75] Inventors: Bhaskar Mavadia, Solihull; Jeremy A. Scarlett, Chatham, both of United Kingdom

[73] Assignee: Econocruise Limited, Warwickshire, England

[21] Appl. No.: 347,742

[22] Filed: May 5, 1989

[30] Foreign Application Priority Data

May 17, 1988 [GB] United Kingdom ........... 8811650

[51] Int. Cl.⁵ .................................... H02K 33/12
[52] U.S. Cl. .................................... 310/23; 310/30; 335/230
[58] Field of Search ............ 310/15, 17, 23, 30, 310/34, 36, 37, 216, 254; 335/230, 261

[56] References Cited

U.S. PATENT DOCUMENTS

| | | | |
|---|---|---|---|
| 3,644,763 | 2/1972 | Skrobisch | 310/36 |
| 4,476,408 | 10/1984 | Honsinger | 310/156 |
| 4,482,847 | 11/1984 | Rudich, Jr. et al. | 310/68 B |
| 4,691,135 | 9/1987 | Sogabe et al. | 310/254 |
| 4,835,426 | 5/1989 | Henville | 310/23 |

FOREIGN PATENT DOCUMENTS

| | | |
|---|---|---|
| 3025633 | 1/1981 | Fed. Rep. of Germany |
| A334787 | 1/1959 | Switzerland |
| 446690 | 5/1936 | United Kingdom |
| 539773 | 12/1938 | United Kingdom |
| 2016212 | 9/1979 | United Kingdom |
| 1596394 | 8/1981 | United Kingdom |
| 1598257 | 9/1981 | United Kingdom |
| 1603026 | 11/1981 | United Kingdom |
| 2081981 | 2/1982 | United Kingdom |

Primary Examiner—Steven L. Stephan
Assistant Examiner—Judson H. Jones
Attorney, Agent, or Firm—Nixon & Vanderhye

[57] ABSTRACT

An electromagnetic actuator has a tubular stator with at least two opposed, external pole pieces carrying energizing windings, and a permanent magnet rotor inside the stator and rotatable about the major axis of the stator, the rotor having at least two oppositely-directed permanent magnets extending axially of the rotor and in closely spaced relation to the stator, said magnet each occupying less than 180° of the circumference of the rotor, the leading and/or trailing edge of each magnet being tapered and/or chamfered.

12 Claims, 6 Drawing Sheets

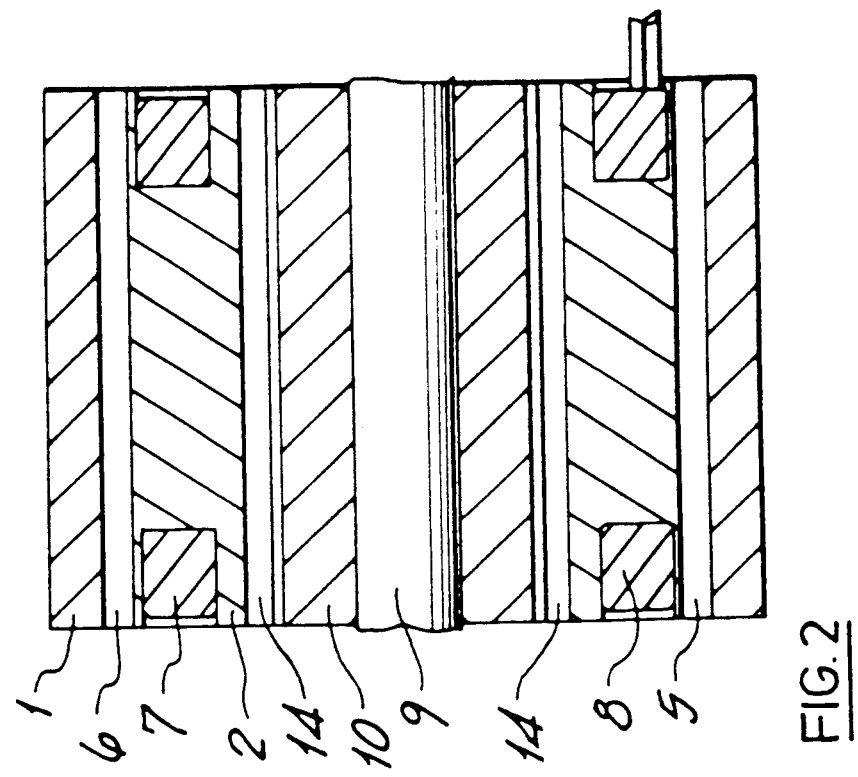
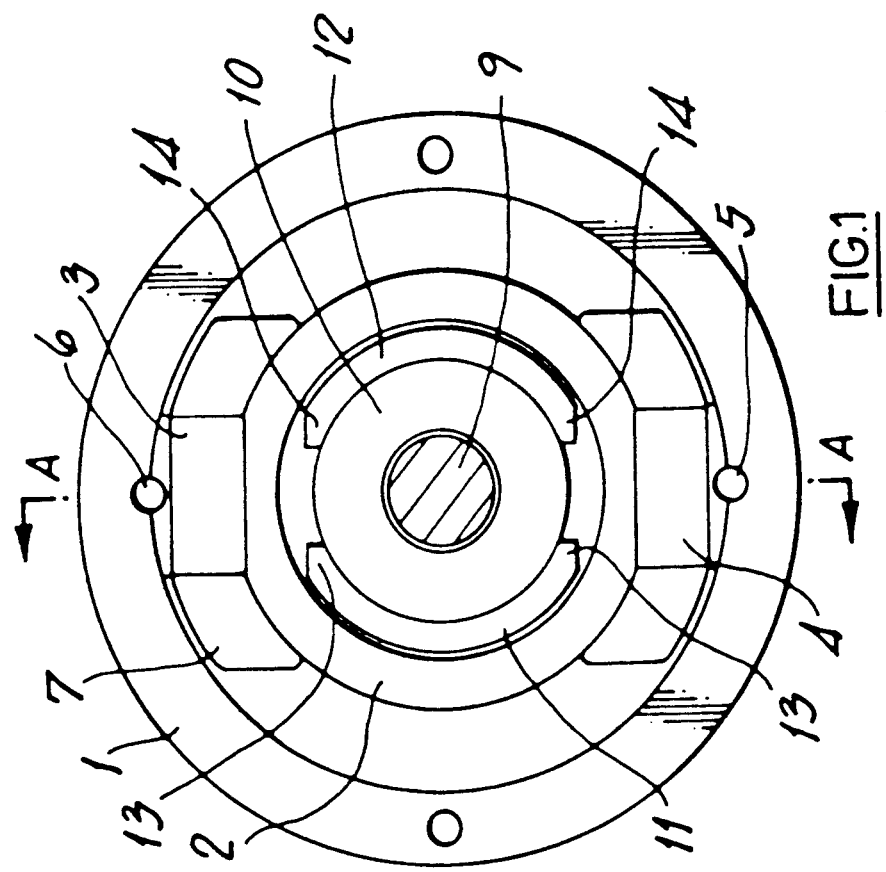

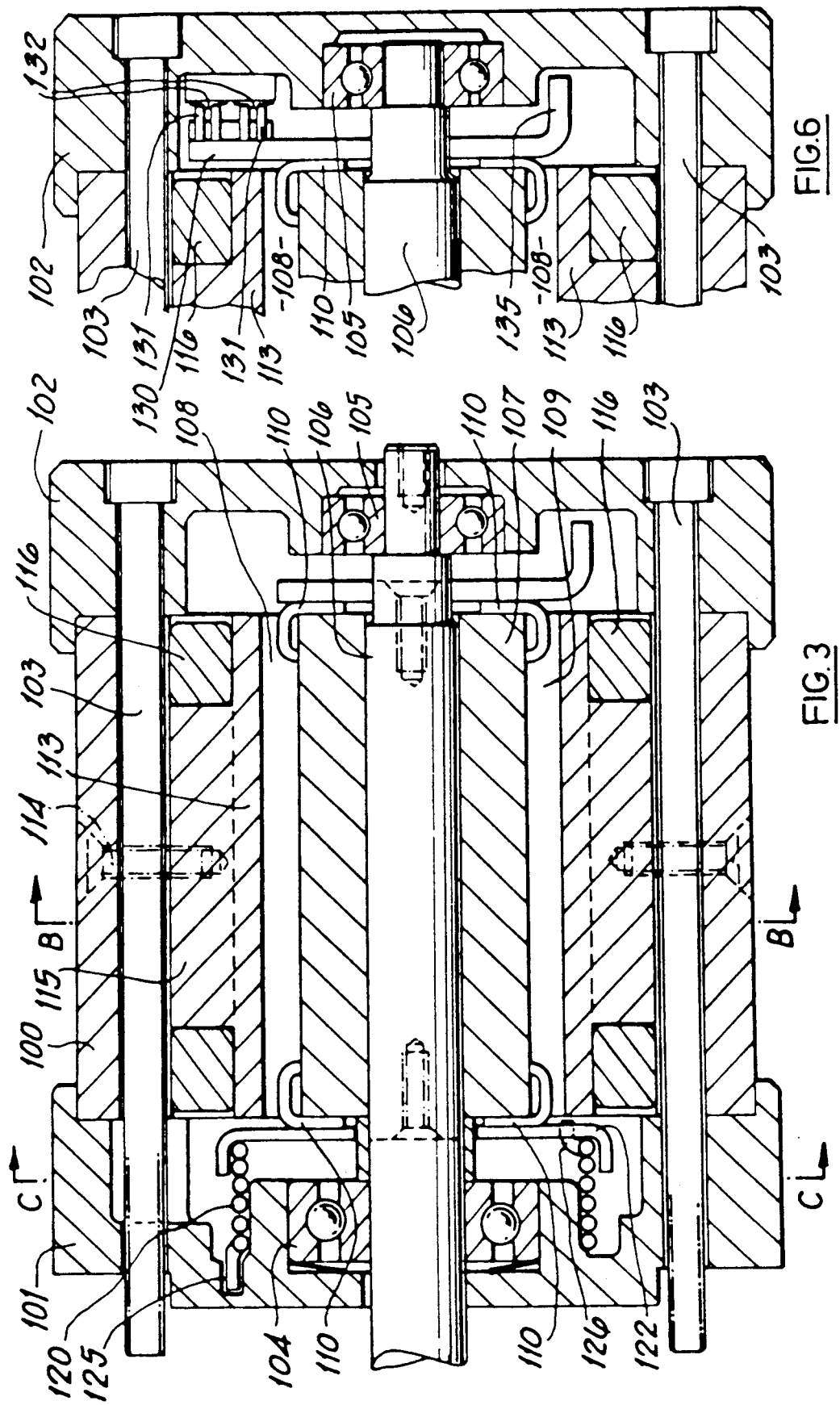

ELECTROMAGNETIC ACTUATORS

This invention relates to electric motors of the kind used to achieve limited, but precise angular displacements. Numerous devices are known for this, for example selsyn motors where rotation of one motor spindle is exactly reproduced at a second motor spindle, the two motors being connected only by wiring. Both AC and DC selsyn systems are widely used. Stepping motors responsive to a pulse waveform are also widely used.

However, selsyn systems are relatively costly and stepping motors do not provide the smooth actuation characteristic needed for many applications. Another essential requirement is high torque, which selsyn motors do not normally provide.

It has been proposed to employ what is in effect a rotary solenoid, having a stator with at least two internal pole pieces and a rotor provided with a permanent magnet (or electromagnet). Such devices work, but with relatively low efficiency and/or positional accuracy.

According to this invention, an electromagnetic actuator comprising a tubular stator provided with at least two opposed, pole pieces carrying energising windings, and a permanent magnet rotor inside the stator and rotatable about the major axis of said stator, said rotor having at least two oppositely external pole pieces carrying energising windings, said permanent magnet rotor located inside said stator and rotable about the major axis of said motor. The actuator is characterised by the provision of means located internally of said actuator to limit the angular rotation of the rotor relative to the stator to less than about 180°, together with spring means effective to bias the rotor towards an unactuated state, and means for generating an electrical signal corresponding to the extent of absolute angular displacement of the rotor relative to said unactuated state. The pole pieces of the stator are preferable located externally of the stator, which is perferable of unitary, laminated construction.

If the stator is in one piece, with no gaps, there is minimal flux loss and/or distortion. An equivalent toroidal flux path is provided by two conventionally-wound coils mounted on projections from a toroidal stator. Because the windings are externally mounted, the permanent magnet rotor can be disposed with minimal clearance to the stator. There are of course no internal pole pieces and there is therefore no need for precision-wound internal windings or toroidal windings. The windings can be made separately on conventional bobbins. More significantly, there is no need for special winding techniques to form the windings in situ around internal pole pieces. The construction is thus less costly. There is also of course no need for a commutator and its associated brushes.

The close spacing of rotor and stator is helpful in achieving good torque and accurate positioning. The response characteristics can be adjusted by tapering or chamfering the leading and/or trailing edges of the permanent magnets in the rotor so as to achieve optimum positioning accuracy over a desired angular rotation, typically much less than 180°. A similar effect may also be accomplished by the installation of shaped or profiled metal bars for example, steel, positioned between the rotor magnet poles and extending lengthwise with respect to the poles. Some experimentation may be needed in order to achieve optimum performance.

The rotor is biassed by spring means to its unactuated attitude or state. Most conveniently this is accomplished by means of at least one spring connected between the stator and rotor in such a way that actuation causes the spring to be subjected to increased torsion.

Preferably the rotor includes a non-magnetic spindle disposed so that at least the portion thereof extending from the actuator (for connection to associated apparatus) is non-magnetic. This minimises the risk of magnetic debris attaching itself to the spindle, with the attendant risk of clogging and/or obstructing the operation of the associated apparatus.

Position of attitude sensing is essential where the device forms a part of a control system and it is necessary to be able to determine the precise amount of relative angular rotation between the rotor and the stator at any given time. Accordingly, the actuator is provided with means for determining the relative angular displacement of the rotor. These means may be a potentiometer, the resistive element of which is mounted on the stator and the wiper of which is connected to the rotor, so that angular displacement of the latter moves the wiper along the resistive element. However, it is also possible to determine the angular displacement by an inductive means, thereby avoiding the need for mechanical contact. In many applications where high reliability is essential, this is preferred.

Whichever sensing means is used, it will be appreciated that it may be connected through power control circuitry to establish and/or maintain a desired angular displacement.

The stator is preferably provided with at least two energising windings for each pole piece. The availability of at least two windings is useful not just for increased control capability, but also to provide back-up in the event of a winding failure. In certain applications, the provision of redundant circuitry is desirable for safety reasons.

The maximum extent of angular rotation is preferably settable by independant, but internal mechanical means such as adjustable end stops, so that over-rotation in either direction is not possible.

In order that the invention be better understood embodiment of it will now be described by way of example with reference to the accompanying drawings which:

FIG. 1 is an end view partly in section of a simplified electromagnetic actuator according to the invention, FIG. 2 is a schematic cross-sectional side view on line A—A of FIG. 1.

Figure 5:
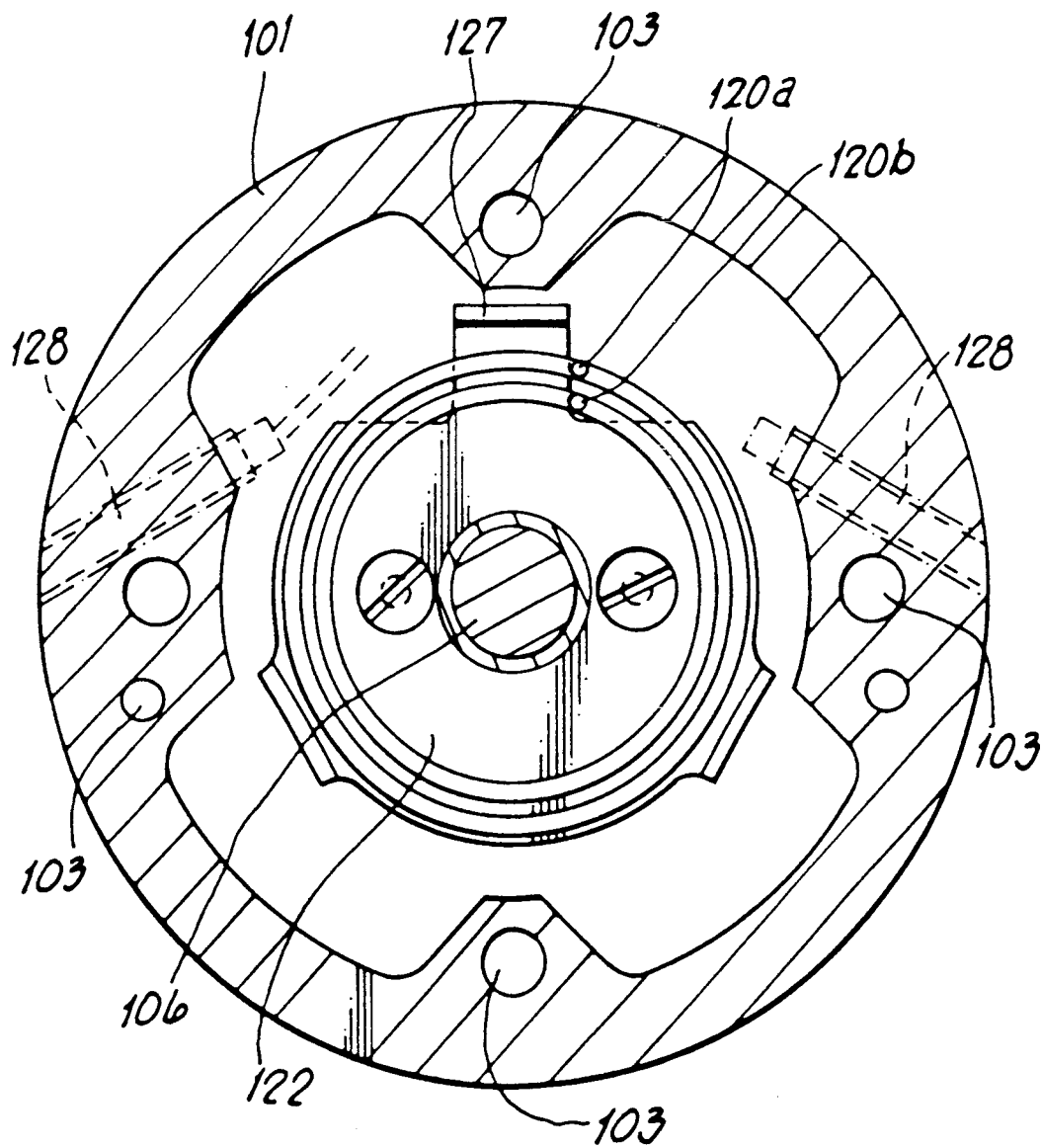
Figure 7:
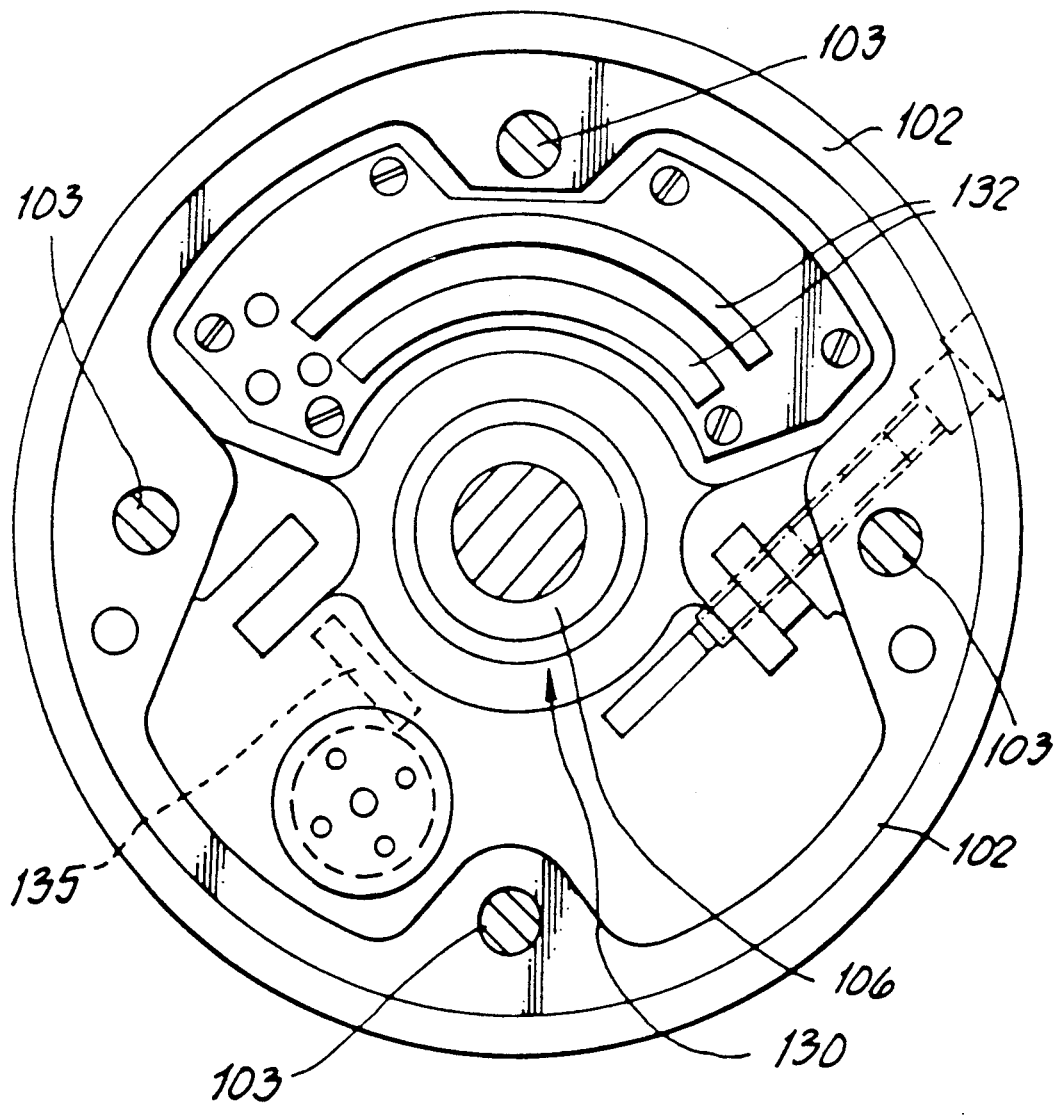
Figure 8:
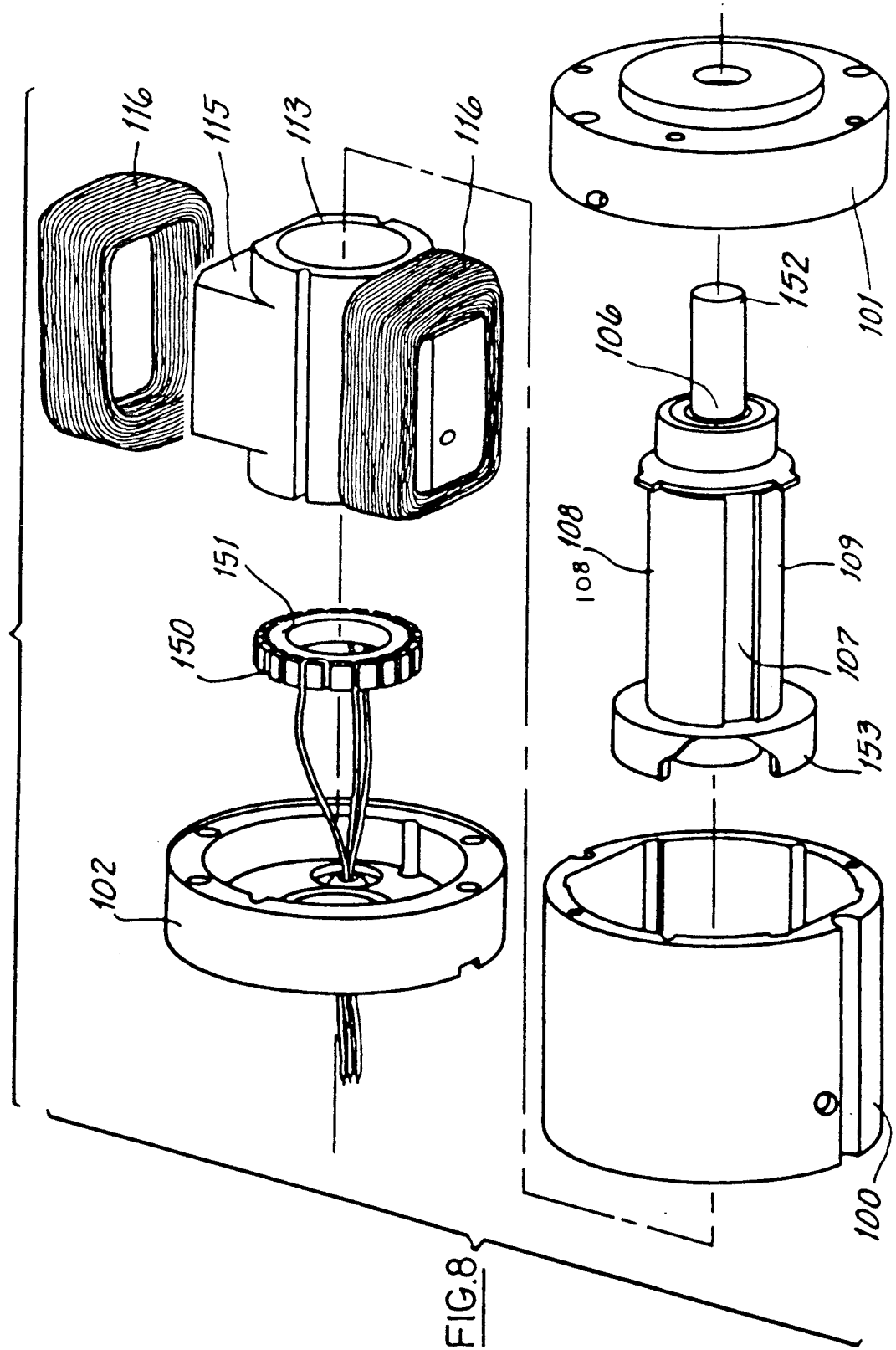

FIG. 3 is a cross-sectional side view of a second embodiment of the invention partly in section, FIG. 4 is an end view, partly in section, taken on line B—B of FIG. 3, FIG. 5 is another end view, partly in section, taken on line C—C of FIG. 3, FIG. 6 is a portion taken from FIG. 3, showing slightly more detail, FIG. 7 is a further end view, partly in section, of the portion shown in FIG. 6, and FIG. 8 is a pictoraial view of a partly dismantled actuator generally similar to that of FIG. 3, but incorporating a different sensing means.

Like parts in FIGS. 1 and 2 bear like reference numerals for ease of reference. Likewise in FIGS. 3–8 common reference numerals are used as far as is practicable.

Referring to the FIGS. 1 and 2, a tubular outer casing 1 locates a cylindrical stator 2 by means of outwardly directed pole pieces 3, 4 and locating holes 5, 6 extending through the casing/pole pieces. Pre-formed windings 7, 8 are installed on the pole pieces. Rotatably supported inside the casing by end bearings (not shown) a shaft 9 carries a rotor 10 which is provided with 2, oppositely-directed magnets 11, 12. The latter extend axially of the rotor, but each only occupies some 120° in a circumferential direction, the leading and trailing edges being tapered/chamfered as indicated at 13, 14 respectively.

It will be appreciated that in FIGS. 1 and 2 the actuator end cover plates and bearing assemblies have been omitted, in the interest of clarity. This very simplified device is shown in the neutral, or un-operated attitude. Also omitted, in the interest of clarity, are details of position sensing, return springs and end stops, which are needed for practical use. Examples of these features can be found in FIGS. 3-8, the details of which will now be described more fully.

Starting with FIGS. 3 and 4, an electromagnetic actuator comprises a generally cylindrical body 100, is provided with end caps 101, 102 which are retained by four set screws 103, (two only shown) equally spaced about the circumference of the caps. Bearing assemblies 104 and 105 in the respective end caps support a shaft 106 which is rotatable about the axis of the body 100. The shaft carries a rotor 107 comprising a pair of permanent magnets 108, 109 respectively. The shape and disposition of these is best seen by referring to FIG. 4, or to FIG. 1 where the corresponding parts are numbered 10, 11 and 12 respectively.

The magnets are retained in place by four clamps, 110. The leading and/or trailing edges of the magnets are chamfered, at 111 and 112, exactly as previously described in relation to FIG. 1 where the corresponding parts are 13 and 14 respectively. The rotor is surrounded by a unitary tubular, laminated electromagnet core 113 which is retained in the body 100 by a number of set screws 114. The core has radially outwardly extending pole pieces 115 extending lengthwise of the core. These carry pre-formed electromagnet coils 116, each comprising two independant windings.

Referring now to FIGS. 3 and 5, the end cap 101 houses a torsion spring 120, one end 121 of which is retained by engagement in an aperture 126 in a retaining/locating plate 122 attached to a collar 123 on the shaft 106. The opposite end 124 of the spring is retained in a bore 125 in the end cap. The spring 120 may be constituted by two springs 120(a) and 120(b), as shown in FIG. 5, to give improved reliability.

FIG. 5 also illustrates how angular rotation may be limited. The rim of the plate 122 on the shaft 106 is configured with a radial projection 127. Adjustable end stop screws 128 extending through the cap 101 and disposed generally tangentially with respect to the rim of the plate 122 co-operate with the projection 127 to limit rotation in either direction from the position shown; (the projection is not seen in FIG. 3).

Referring now to FIGS. 6 and 7 the other end cap, 102, encloses a potentiometer contact plate 130 attached to the shaft 106. This plate 130 carries a pair of contacts 131 which slide against resistive tracks 132 on the inside of the cap 102. The plate 130 also incorporates an abutment or projection 135, which together with co-operating set screws (not shown) provides further, non-adjustable end stops to limit angular rotation, in this case to 90°.

In use, energisation of the windings causes angular displacement of the rotor against the restoring force exerted by the spring 120. The extent of the rotation is reflected in the change in resistance due to movement of the contacts 131 over the tracks 132 and can be processed, in known manner, to generate a control signal which is applied to control the power applied to the windings. In this way, the actuator can be operated to give precisely controlled angular displacement of the shaft 106, for example to control throttle opening in a typical automotive application.

Referring now to FIG. 8, a complete actuator is shown as notionally dismantled into portions. For ease of identification these portions are labelled exactly as in FIG 3-7. However in this instance, relative angular displacement is determined by means of an inductive sensor comprising a plurality of windings 150 mounted around the periphery of a support 151 which is mounted to the inside of the end cap 102. It should be noted that this particular embodiment features a drive shaft extension 152, from the opposite end of the actuator to that shown in the other figures. This is of course purely a matter of convenience and does not affect the principle of construction involved. Mounted on the rotor is a generally cup-shaped metal element 153 which encloses the support 151 in close proximity to the windings 150. The element 153 is of asymmetric construction such that its rotations affects the electrical properties of the windings 150. This effect is used to derive an accurate indication of the angle through which the rotor has turned in response to energisation of the windings 116.

We claim:

1. An electromagnetic actuator comprising a unitary tubular stator provided with two opposed pole pieces and having energizing windings mounted externally of said stator and a permanent magnet rotor located inside and rotatable about the major axis of said stator, means located internally of said actuator to limit the angular rotation of the rotor relative to the stator to less than about 180°, together with spring means effective to bias the rotor towards an unactuated state, and means for generating an electrical signal corresponding to the absolute angular displacement of the rotor relative to said unactuated state.

2. An electromagnetic actuator according to claim 1, wherein said means for generating said electrical signal is a potentiometer responsive to relative angular displacement of said rotor.

3. An electromagnetic actuator according to claim 1, wherein said means for generating said electrical signal is an inductive sensor responsive to relative angular displacement of said rotor.

4. An electromagnetic actuator according to claim 1, wherein said stator is of unitary, laminated construction.

5. An electromagnetic actuator according to claim 1, of brushless and commutator-less construction.

6. An electromagnetic actuator according to claim 1, wherein the leading or trailing edges of both the leading and trailing edges of permanent magnets constituting said rotor are tapered or chamfered to adjust the response characteristics of the actuator.

7. An electromagnetic actuator according to claim 1, wherein profiled and shaped metal bars are located between the rotor magnet poles extending lengthwise thereof to modify the response characteristics of the rotor.

8. An electromagnetic actuator according to claim 1, including independent internal means for limiting the rotation of the rotor relative to the stator.

9. An electromagentic actuator according to claim 8, characterized in that said independent internal means are constituted by adjustable end stops.

10. An electromagnetic actuator according to claim 1, wherein the stator is provided with at least two energizing windings in each stator pole piece.

11. An electromagnetic actuator according to claim 10, wherein said energizing windings are provided with independent driving circuitry.

12. An electromagnetic actuator according to claim 1, wherein at least a rotor spindle portion extending from the actuator for connection to associated apparatus is made of a substantially non-magnetic material.

* * * * *